June 5, 1962  A. J. SARKA  3,037,410

SHEARING CONTINUOUSLY ADVANCING STRIP

Filed Oct. 19, 1956  3 Sheets-Sheet 1

*INVENTOR.*
Albert J. Sarka

BY *Hoopes Leonard & Buell*
*his attorneys*

INVENTOR.
Albert J. Sarka

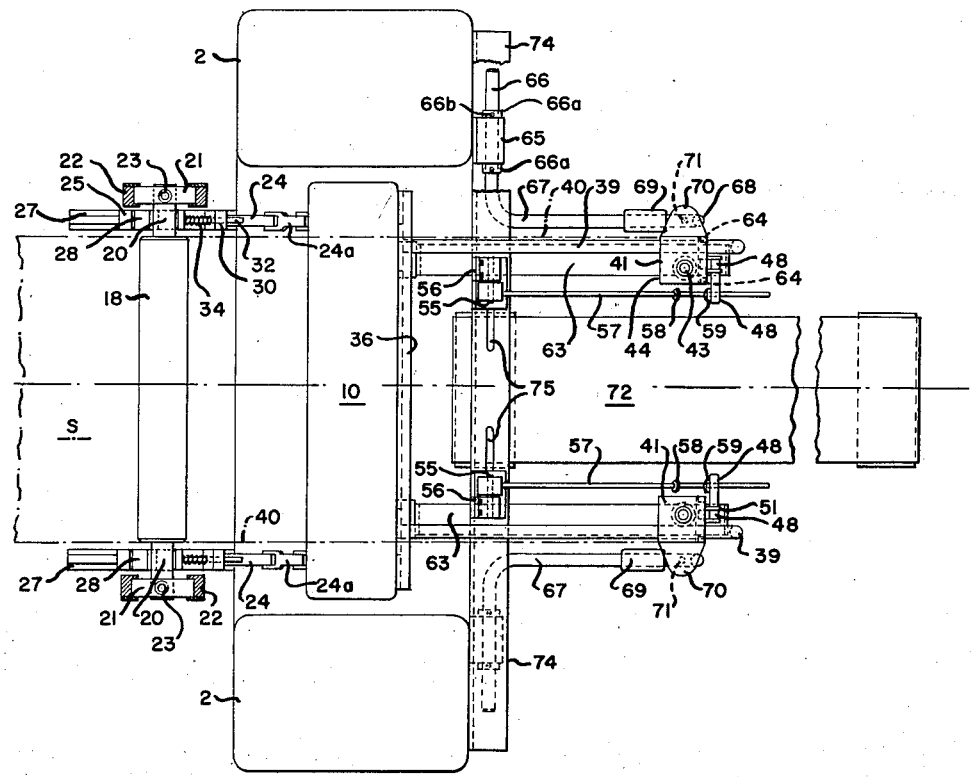

United States Patent Office 3,037,410
Patented June 5, 1962

3,037,410
SHEARING CONTINUOUSLY ADVANCING STRIP
Albert J. Sarka, Maple Heights, Ohio, assignor, by mesne assignments, to The Wean Engineering Company, Inc.
Filed Oct. 19, 1956, Ser. No. 617,180
7 Claims. (Cl. 83—37)

This invention relates to shearing continuously advancing strip. It has to do particularly with a method for shearing continuously advancing strip whereby lengths or shapes of the material of the strip can be sheared at high speed and with great accuracy and without forming register holes in the strip.

In my copending application Serial No. 571,418, filed March 14, 1956, now Patent No. 2,857,966, are disclosed a method of and apparatus for shearing sheets from continuously advancing strip in which the strip is cyclically acted on by flying shears which advance with the strip while shearing it and at least one register hole is formed in the strip on the feed side of the transverse line of shearing simultaneously with each shearing action of the flying shears. Also simultaneously with each shearing action of the flying shears register means connected and moving with the flying shears are caused to enter the register hole or holes formed in the strip simultaneously with the preceding shearing action of the flying shears whereby to accurately position the leading end of the strip for each shearing action. The invention of said application was developed in connection with work which I did in scroll shearing from continuously advancing strip sheets for blanking can ends or other generally rounded blanks, although that invention is not limited to scroll shearing.

My present invention is for generally the same purpose as the invention of my above mentioned copending application. At times the formation of register holes in the material is undesirable. By my present invention I obtain results at least equal to those obtained by use of the invention of my above mentioned copending application but with the important advantage that register holes are not formed in the material. My present invention has utility in scroll or other shearing.

I provide a method of shearing continuously advancing strip comprising cyclically advancing a shear along the strip, advancing a front stop with the shear, registering the leading end of the strip to the advancing front stop and with the leading end of the strip registered to the advancing front stop operating the shear to shear the strip. In the cyclic operation the shear is advanced in the direction of advance of the strip at a speed increasing to substantially the speed of the strip. The leading end of the strip catches up to and becomes registered to the advancing front stop. With the leading end of the strip so registered the shear operates to shear the strip. The shear may be a straight shear forming rectangular sheets or it may be a scroll shear forming scroll sheets or it may be of other shape to form sheared edges of desired configuration.

I preferably advance with the shear means including a front stop so that the leading end of the strip catches up to and becomes registered to the advancing front stop as above mentioned, and with the leading end of the strip registered to the advancing front stop I preferably clamp the strip adjacent the leading end thereof to said means, and with the strip so clamped I operate the shear to shear the strip. With the strip clamped with the leading end of the strip registered to the advancing front stop I preferably draw the strip taut just before operation of the shear to shear the strip.

The registry of the leading end of the strip to the advancing front stop may be accompanied and aided by a slight buckle of the strip. Such buckle, if formed, is removed when the strip is drawn taut just before shearing.

I preferably positively feed the strip to the shearing zone and interrupt the positive feed of the strip to the shearing zone at the time of shearing so that at that time the advance of the strip is controlled by the front guide and clamping means and hence by the shear itself since the front guide and clamping means are directly connected with the shear.

I also provide apparatus for shearing continuously advancing strip comprising a cyclically operable shear which advances while it shears, a front stop connected with the shear and advanceable therewith, means for advancing strip relatively to the shear to register the leading end of the strip to the advancing front stop and means carried by the shear for severing the strip while the leading end of the strip is registered to the advancing front stop. I preferably employ means including a front stop connected with the shear and advanceable therewith, such means including in addition to the front stop clamping means for clamping the strip adjacent the leading end thereof in registered relation to the advancing front stop prior to the severing or shearing step. Means are preferably provided for rendering inoperative the means for advancing the strip while the strip is being severed so that at the instant of shearing the strip is in effect controlled by the shear itself.

I preferably provide means for rendering the clamping means inoperative until the leading end of the strip reaches the front stop and means for rendering the clamping means operative when the leading end of the strip reaches the front stop.

The shear preferably has opposed relatively movable heads and a first clamping member is preferably connected with and disposed forwardly of one of the heads and a second clamping member is preferably connected with and disposed forwardly of the other head. Means are preferably provided maintaining the clamping members separated until the leading end of the strip reaches the front stop, and means are also preferably provided for relatively moving the clamping members toward each other to clamp the strip when the leading end of the strip reaches the front stop.

The front stop is preferably connected with one of the clamping members and preferably projects therefrom generally in the direction of the other clamping member but laterally offset from the other clamping member so that as the clamping members move toward each other the front stop is interposed in the path of the advancing strip but permits the clamping members to clamp the strip.

One of the clamping members is preferably resiliently mounted to enable it to cooperate with the other clamping member to clamp the strip as the heads move toward each other. Latch means are preferably provided for latching the resiliently mounted clamping member in position transversely retracted relatively to the head carrying it as compared with its most advanced transverse position relatively to that head, and means are preferably provided for rendering the latch means operative as the clamping members move away from each other to insure passage space between the clamping members for the severed leading end of the strip.

Means are preferably provided for rendering the latch means inoperative and thereby releasing the second clamping member as the heads move toward each other. Control means are preferably provided for stopping movement of the resiliently mounted clamping member short of clamping relationship to the strip and the cooperating clamping member but in position to insure that the leading end of the strip will move between the clamping members and be registered to the front stop, the control means becoming inoperative as the leading end of the strip is registered to the front stop. The control means are preferably disposed in the path of the resiliently mounted clamping member as the clamping members move relatively toward each other and forwardly in the cyclic operation of the shear, and the control means are preferably so positioned that the resiliently mounted clamping member moves beyond the control means as the leading end of the strip is registered to the front stop whereby the clamping members are permitted to clamp the strip. The means for rendering the latch means inoperative and thereby releasing the second clamping member as the heads move toward each other are preferably in the form of a detent disposed in the path of the latch means. The detent may be carried by an arm pivotally connected with the shear housing.

Other details, objects and advantages of the invention will become apparent as the following description of a present preferred method of practicing the same proceeds.

In the accompanying drawings I have illustrated a present preferred method of practicing the invention and have shown one form of apparatus suitable for practice of the invention in which:

FIGURE 5 is a fragmentary diagrammatic plan view of the apparatus as shown in FIGURE 1.

Figure 1:
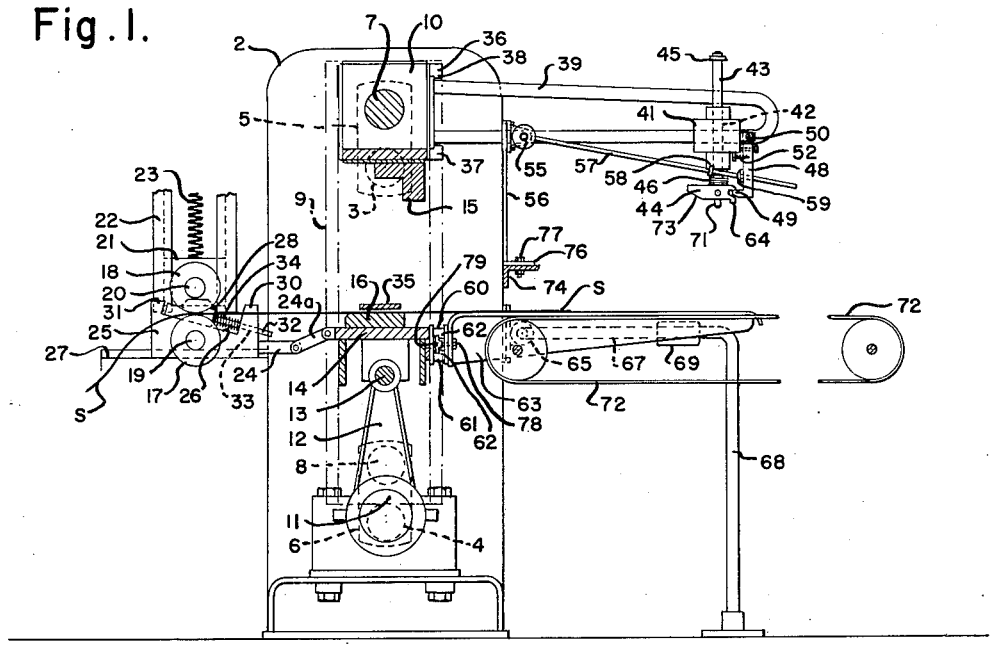
FIGURE 1 is a fragmentary diagrammatic view partly in elevation and partly in vertical cross section of apparatus for shearing continuously advancing strip, the apparatus being shown in the position in which the shear blades are farthest apart.

Referring now more particularly to the drawings, the shear housing is designated generally by reference numeral 2. The shear which is shown in the drawings is of the type disclosed in my copending application Serial No. 474,234, filed December 9, 1954, and now well known to those skilled in the art. Other flying shears may, however, be employed. In view of that fact and since the present invention does not consist of the shear structure per se but rather has to do primarily with the front stop and clamping means and the operating means therefor I have not shown the mechanism of the shear itself in detail. Upper and lower shafts indicated respectively at 3 and 4 rotate in the same direction (counterclockwise viewing FIGURES 1–4) at the same speed and respectively carry parallel cranks 5 and 6 of equal length. The crank 5 has a crank pin 7 and the crank 6 has a crank pin 8. Carried by the crank pins 7 and 8 for rotary movement in the counterclockwise direction viewing FIGURES 1–4 is a frame 9 which carries the upper head 10 of the shear.

Journaled in the housing 2 at 11 are a pair of parallel arms 12 pivotally connected at 13 to the lower head 14. The lower head 14 is guided for up and down movement in the frame 9. Thus as the frame 9 carrying the upper head 10 partakes of its rotary or cyclic movement the lower head 14 oscillates back and forth about the axis 11. The upper shear blade 15 is carried by the upper head 10 and the lower shear blade 16 is carried by the lower head 14. The operation of the shear itself is very clearly shown in the drawings, in addition to which it is, as stated above, well known to those skilled in the art. The shear blades are farthest apart in FIGURE 1. In FIGURE 2 they are at their extreme left hand position with the upper shear blade moving downwardly toward the lower shear blade. In FIGURE 3 the shear blades are shown in their extreme shearing position moving toward the right at substantially the speed of the strip. In FIGURE 4 the shear blades are at their extreme right hand position with the upper shear blade moving upwardly away from the lower shear blade.

Before describing the front stop and clamping means and the operating means therefor I shall describe the means for feeding the strip to the shear. The strip is designated S. It is fed toward the right by driven feed rolls 17 and 18. The lower feed roll 17 is carried by trunnions 19 having a stationary axis. The upper feed roll 18 is carried by trunnions 20 mounted in bearing blocks 21 vertically movable in guide means 22 and urged downwardly by compression coil springs 23. The feed rolls 17 and 18 are preferably both driven; they may be geared to each other by gears designed to permit slight separation of the rolls without interfering with the drive as well known to those skilled in the art. The rolls are driven in a direction to advance the strip S toward the right viewing the drawings, and they are effective for thus advancing or feeding the strip when the upper roll 18 is pressed downwardly against the strip resting on the lower roll 17 by the springs 23. When the upper roll 18 is slightly raised upwardly against the action of the springs 23 the positive feeding of the strip S by the rolls 17 and 18 is interrupted. The drive for the feed rolls is designed so that the feed rolls advance the strip at a speed approximately equal to the horizontal component of the speed of the shear blades 15 and 16 at the instant of shearing.

Figure 2:
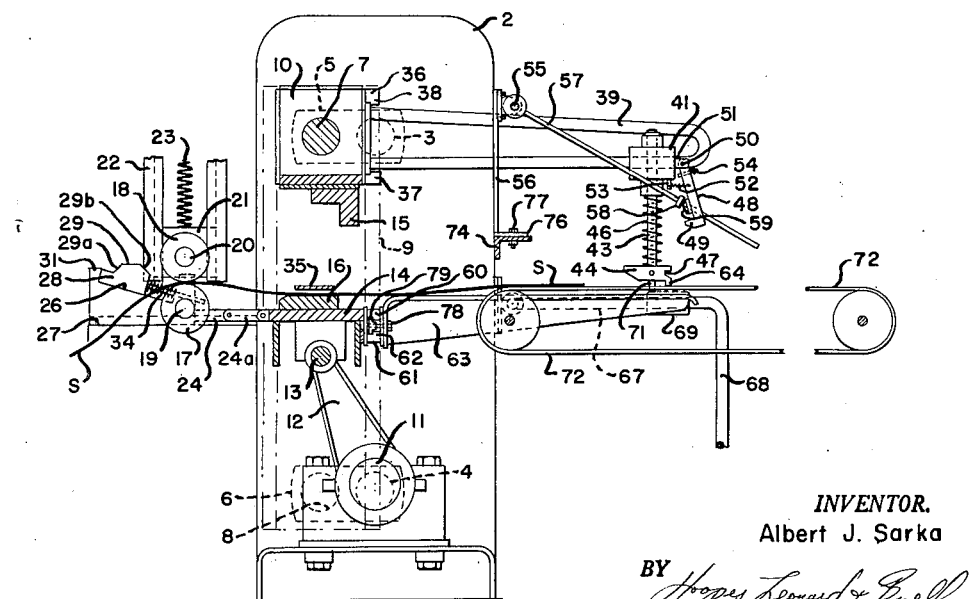
FIGURE 2 is a view similar to FIGURE 1 of the same apparatus but showing the shear blades relatively moving toward each other in a shearing stroke.
Figure 3:
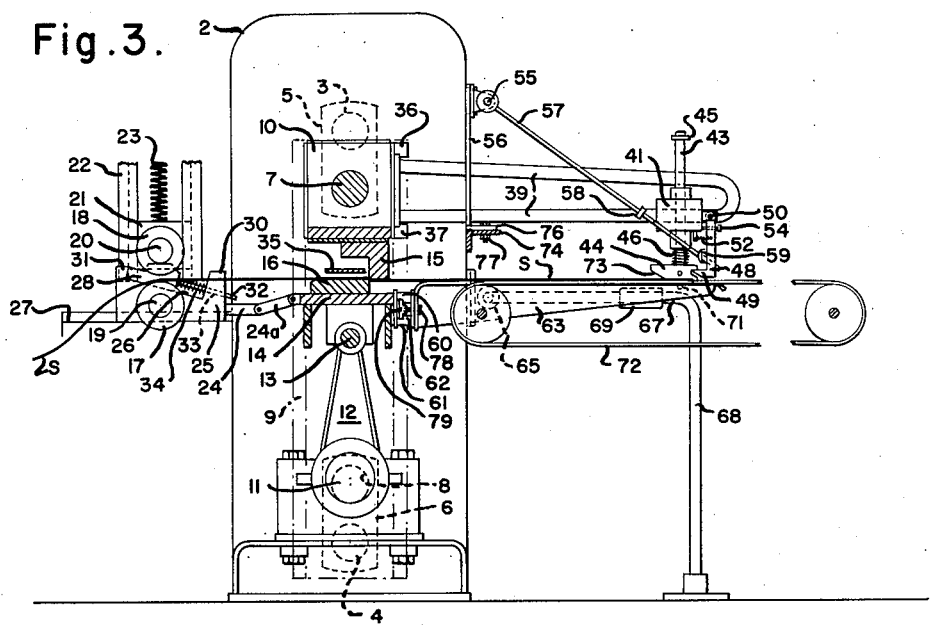
FIGURE 3 is a view similar to FIGURES 1 and 2 of the same apparatus by showing the shear blades in their extreme shearing position.
Figure 4:
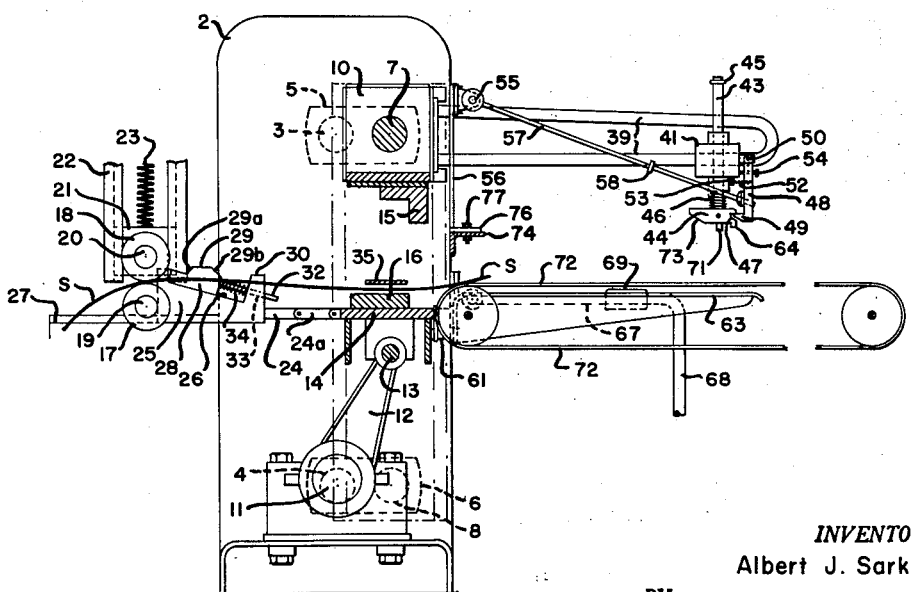
FIGURE 4 is a view similar to FIGURES 1, 2 and 3 of the same apparatus but showing the shear blades relatively moving away from each other after completion of the shearing or severing operation.

Connected with the lower head 14 through rods 24 are blocks 25 each having a generally planar upper surface 26 which is inclined downwardly from left to right as shown in FIGURES 1–4. The blocks 25 are adapted to slide back and forth in guide supports 27. Slidably mounted on the inclined surface 26 of each of the blocks 25 is a slide 28 having an upper face comprising a generally horizontal central portion 29 and inclined end portions 29a and 29b. The respective slides 28 are disposed to move directly under the respective trunnions 20 between the ends of the roll 18 and the bearing blocks 21. The blocks 25 move back and forth from right to left as the shear operates as shown in FIGURES 1–4. They move in a horizontal plane determined by the guide supports 27, the rods 24 having link connections 24a with the lower head 14 to compensate for the change in elevation of the lower head 14 between the elevation of that head as shown in FIGURES 1 and 3 on the one hand and its elevation as shown in FIGURES 2 and 4 on the other hand.

Each block 25 has an upward projection 30 at its right hand end and a bumper 31 at its left hand end. The bumpers 31 limit the movement of the slides 28 toward the left. Connected with each slide 28 is a guide rod 32 which extends generally toward the right therefrom and passes through a guide bore 33 in the upward projection 30 of the corresponding block 25. Thus each slide 28 is guided for movement along the inclined surface 26. A compression coil spring 34 urges each slide 28 toward the left, and the compression coil springs 34 normally maintain the slides 28 against the bumpers 31.

When the blocks 25 move toward the left viewing the drawings the upper faces of the slides 28 engage the trunnions 20 and tend to raise the upper feed roll 18. However, the slides 28 are by the trunnions held against movement toward the left as the blocks 25 move toward the left, the springs 34 being progressively compressed. As the blocks 25 continue their movement toward the left the slides 28 ride down the inclined surfaces 26, compressing the springs 34 as just mentioned, until they are at a level low enough to enable them (the slides 28) to pass underneath the trunnions 20. They are then projected toward the left against the bumpers 31 by the springs 34. Thus on the movement of the blocks 25 toward the left the continuous operation of the feed rolls 17 and 18 is not interrupted.

On the movement of the blocks 25 toward the right viewing the drawings the slides 28 are against the bumpers 31 and cannot yield and the upper faces thereof engage and raise the trunnions 20 and hence the upper feed roll 18 against the action of the springs 23. Such raising of the upper feed roll occurs just as the cut is about to be made by the shear blades 15 and 16 and immediately after the leading end of the strip has been registered to the front stop and clamped by the clamping means as will presently be described. The raising of the upper feed roll 18 is only momentary and it is lowered to resume feeding of the strip immediately after the shearing operation. The upper feed roll returns to operative position under the action of the springs 23 as soon as the slides 28 have passed in their movement to the right. The purpose of the means for rendering the feed rolls inoperative for a small portion of the cycle is to allow the front stop and clamping means, and hence in effect the shears, to control the forward movement of the strip at the instant of shearing.

I find it desirable to regulate the speed of the feed rolls 17 and 18 so that the registering of the leading end of the strip to the front stop, which registering is brought about by the advance of the strip under the action of the feed rolls, is accompanied and aided by a slight buckle of the strip; in other words, the feed rolls may advance the strip just a little faster than the speed of advance of the front stop at the time when the leading end of the strip is registered to the front stop, causing a slight humping of the strip between the feed rolls and the front stop. This insures positive registry of the leading end of the strip to the front stop at the time when the strip is clamped. Then the feed rolls are rendered momentarily inoperative by the mechanism above described and the strip is drawn taut just an instant before the shearing operation takes place. This insures great accuracy in the length of the sheets being sheared from the strip S.

A plate 35 is provided in the shear just above the lower shear blade 16 to maintain the strip in its proper path during the cyclic operation.

Extending transversely of the upperhead 10 at the forward face thereof is a bracket support comprising upper and lower bars 36 and 37 each of which has a projection 38 extending toward the other. Mounted on the forward face of the upper head 10 and supported by the bracket support are two brackets each designated generally by reference numeral 39, one adjacent each side of the apparatus. The brackets 39 are of generally U shape as shown in FIGURES 1–4 and are transversely adjustable in the bracket support. The lower leg of each bracket is generally horizontal. For each width of strip being sheared each bracket 39 is adjusted transversely of the upper head 10 so as to be positioned approximately at one of the edges of the strip. The brackets 39 are maintained in desired adjusted position by any suitable means. For example, the bars 36 and 37 may be screwed to the upper head 10 and when the brackets 39 are to be adjusted the screws may be somewhat loosened to permit the adjustment, whereafter the screws may be tightened so that the portions 38 of the bars 36 and 37 tightly clamp the brackets to the upper head 10.

The apparatus is symmetrical about the longitudinal center line as shown in FIGURE 5. Each of the longitudinal edges of the strip S is indicated at 40 in FIGURE 5. It will be noted that each bracket 39 as shown in FIGURE 5 has its outer vertical plane approximately in the vertical plane of the corresponding edge 40 of the strip.

Mounted on the lower leg of each of the brackets 39 is a carrier 41 which is adjustable longitudinally of the bracket in accordance with the length of the sheets to be sheared. Each carrier 41 may be clamped to the corresponding bracket 39 by any suitable clamping means (not shown) which may be loosened to enable the carrier to be moved to a desired adjusted position longitudinally of the bracket and then tightened to firmly maintain the carrier in that position. Each of the carriers 41 projects somewhat inwardly or toward the center line of the strip from its bracket 39.

Each carrier 41 has therethrough a vertical bore 42 for guiding a vertical stem 43 carrying at its bottom the corresponding upper clamping member 44. A collar 45 is applied to the upper end of each stem 43 to limit the downward movement of the stem. A compression coil spring 46 is interposed between the bottom of each carrier 41 and the corresponding upper clamping member 44 urging the clamping member downwardly.

Each upper clamping member 44 has in its forward edge a notch 47. A latch 48 having a lateral foot 49 is pivoted at 50 to an extension 51 on each carrier 41. A spring 52 operating between the latch 48 and a downward extension 53 on each carrier 41 urges the corresponding latch to the left viewing FIGURES 1–4. An adjustable stop screw 54 connected with each latch 48 and adapted to engage the front face of the corresponding carrier 41 limits the movement of the latch toward the left.

Mounted on the forward face of the housing 2 somewhat above the pass line and extending transversely is a supporting bar 74 shown as being of generally L shape with one leg disposed against the housing and the other leg projecting horizontally toward the right therefrom viewing the drawings. The supporting bar 74 has therein two elongated slots 75. Mounted upon the supporting bar 74 at each of the elongated slots 75 is an upstanding bracket 56. Each bracket 56 has a foot 76 through which the bracket is adapted to be bolted by a bolt 77 to the horizontal leg of the supporting bar, each bolt passing through the corresponding slot 75. The brackets 56 may be adjusted along the supporting bar 74 in accordance with the width of the strip being sheared.

Pivoted at 55 to each bracket 56 is a rod 57 carrying a detent 58. Each rod 57 passes through an opening in the corresponding latch 48. Each latch 48 has a pad 59 adapted to be engaged by the corresponding detent 58 for moving the latch to the right as will presently be described.

Extending transversely of the lower head 14 at the forward face thereof is a bracket support comprising upper and lower bars 60 and 61 each of which has a projection 62 extending toward the other. Mounted on the bracket support are two brackets each designated generally by reference numeral 63, one adjacent each side of the apparatus. Each bracket 63 is connected with the bracket support by a screw 78 passing through the base of the bracket and between the bars 60 and 61 and threaded into a holding member 79 which when the screw is tightened is drawn up against the projections 62 of the bars 60 and 61. Thus the brackets 63 are maintained in position on the lower head 14 but are adjustable transversely thereof. When it is desired to adjust one of the brackets 63 transversely of the lower head 14 the screw 78 is loosened, the bracket, screw and holding member are moved to the desired position and the screw is tightened. For each width of strip being sheared each bracket 63 is adjusted transversely of the lower head 14 so as to be positioned approximately at one of the edges of the strip and below the clamping member 44 at that side.

The brackets 63 constitute the lower clamping members for clamping the strip. They are elongated forwardly of the shear so that the respective upper clamping members 44 may cooperate therewith at any points therealong depending upon the adjustment of the carriers 41 for the desired sheet length. Each of the upper clamping members 44 has at its forward portion spaced apart downwardly projecting feet 64 which are laterally offset from and adapted to extend downwardly on both sides of the corresponding lower clamping member 63, the feet 64 forming the front stop against which the leading end of the strip is adapted to be registered when the strip is being sheared.

Attached to the forward face of the housing 2 at each side thereof is a generally cylindrical bracket 65 through which passes a bent rod 66. Each rod 66 has a portion 67 extending forwardly generally parallel to the strip spaced somewhat laterally from the nearer edge of the strip and having at its forward end a downwardly projecting leg 68 whose bottom is adapted to rest upon the floor. A control member 69 is mounted on the portion 67 of the rod 66 and adjustable therealong longitudinally of the apparatus. The control member 69 may be fastened by means not shown in desired adjusted positions along the portion 67. The rods 66 may be adjusted laterally with the brackets 39 and 63 in accordance with the strip width and maintained in desired adjusted positions by collars 66a which may be fastened to the rods by set screws 66b.

Projecting laterally outwardly from each upper clamping member 44 is an ear 70 having a downwardly projecting pin 71 which is in the same vertical longitudinal plane as the corresponding control member 69.

A conveyor 72 is disposed between the brackets or lower clamping members 63 with its upper surface approximately flush with the upper surfaces of the brackets 63 and is driven to deliver the sheared sheets toward the right viewing the drawings. The conveyor 72 is preferably driven at a speed somewhat faster than the speed at which the material is advancing while being sheared so that each sheared sheet is moved well out of the way before the next shearing operation.

A cycle of operation of the apparatus will now be described. FIGURE 1 shows the upper and lower heads 10 and 14 in their most widely separated position. The feed rolls 17 and 18 are advancing the strip S to the right. The previously sheared sheet is not shown and it may be presumed that it has been delivered by the conveyor 72 so as to be out of the range of the figure although actually its trailing edge might be within the range of the figure. The latches 48 are holding up the upper clamping members 44. The detents 58 are in inoperative position, being somewhat spaced to the left of the pads 59.

FIGURE 2 shows the heads 10 and 14 in their extreme left hand position and beginning to relatively approach each other to shear the strip. The detents 58 have moved the latches 48 to inoperative position and the springs 46 have moved the upper clamping members 44 downwardly until the pins 71 have come to rest upon the control members 69. In this position the upper clamping members 44 are stopped short of clamping relationship to the strip and the lower clamping members 63 but in position to insure that the leading end of the strip will move between the upper and lower clamping members and be registered to the front stop consisting of the feet 64. Entry of the leading end of the strip between the upper and lower clamping members is facilitated by beveling the upper clamping members as shown at 73. The bottoms of the feet 64 are at least approximately as low as the plane of the upper faces of the lower clamping members 63 so that the leading end of the strip cannot pass beyond the feet 64.

Between the position of FIGURE 2 and the position of FIGURE 3 the pins 71 have run off of the forward ends of the control members 69. At the instant when the pins 71 run off of the forward ends of the control members 69 the leading end of the strip is registered to the front stop 64, such registry preferably being aided by a slight buckle in the strip as above explained. At approximately the same time the upper feed roll 18 is raised as above explained to render the feed rolls inoperative to feed the strip. The leading end of the strip is clamped between the upper clamping members 44 and the lower clamping members 63 which draw the strip taut just before the shear blades 15 and 16 shear the strip. While the strip is clamped between the upper and lower clamping members 44 and 63 the latches 48 resume their operative positions as shown in FIGURE 3, that being permitted by reason of the fact that the pads 59 have moved away from the detents 58, permitting the springs 52 to draw the latches back into operative position with their feet 49 in the notches 47 of the upper clamping members 44.

FIGURE 4 shows the apparatus when the heads 10 and 14 are at their extreme right hand position. The shearing has been completed and the heads are relatively moving apart. The previously sheared sheet is not shown in FIGURE 4. The leading end of the strip S has passed between the heads 10 and 14 as the feed rolls 17 and 18 have again taken charge. The upper clamping members 44 are maintained "cocked" by the latches 48 ready for a repetition of the cycle.

Apparatus as disclosed in this application is claimed in divisional application Serial No. 751,434, filed July 28, 1958.

While I have illustrated and described a present preferred method of practicing the invention it is to be distinctly understood that the invention is not limited thereto but may be otherwise variously practiced within the scope of the following claims.

I claim:

1. A method of shearing continuously advancing strip comprising cyclically advancing along the strip a shear including continuously moving cyclically operating shearing means which move through a complete cycle for each shearing operation and advancing with the shear and relatively to the strip a front stop positioned in the pass line to be butted against by the leading edge of the advancing strip to register the leading edge of the strip to the advancing front stop just before the shearing means move through the shearing portion of the cycle to shear the strip.

2. A method of shearing continuously advancing strip comprising cyclically advancing in the direction of advance of the strip at a speed increasing to substantially the speed of the strip a shear including continuously moving cyclically operating shearing means which move through a complete cycle for each shearing operation, advancing with the shear and relatively to the strip a front stop positioned in the pass line to be butted against by the leading edge of the advancing strip so that the leading edge of the strip catches up to and becomes registered to the advancing front stop and so registering the leading end of the strip just before the shearing means move through the shearing portion of the cycle to shear the strip.

3. A method of shearing continuously advancing strip comprising cyclically advancing in the direction of advance of the strip at a speed increasing to substantially the speed of the strip a shear including continuously moving cyclically operating shearing means which move through a complete cycle for each shearing operation, advancing with the shear and relatively to the strip means including a front stop positioned in the pass line to be butted against by the leading edge of the advancing strip so that the leading edge of the strip catches up to and becomes registered to the advancing front stop and so registering the leading edge of the strip and clamping the strip adjacent the leading edge thereof to said means just before the shearing means move through the shearing portion of the cycle to shear the strip.

4. A method of shearing continuously advancing strip comprising cyclically advancing in the direction of advance of the strip at a speed increasing to substantially the speed of the strip a shear including continuously moving cyclically operating shearing means which move through a complete cycle for each shearing operation, advancing with the shear and relatively to the strip means including a front stop positioned in the path of the leading end of the strip so that the leading end of the strip catches up to and becomes registered to the advancing front stop and so registering the leading end of the strip, clamping the strip adjacent the leading end thereof to said means and drawing the strip taut just before the shearing means move through the shearing portion of the cycle to shear the strip.

5. A method of shearing continuously advancing strip comprising cyclically advancing in the direction of advance of the strip at a speed increasing to substantially the speed of the strip a shear including continuously moving cyclically operating shearing means which move through a complete cycle for each shearing operation, advancing with the shear and relatively to the strip a front stop positioned in the path of the leading end of the strip so that the leading end of the strip catches up to and becomes registered to the advancing front stop, such registry being accompanied and aided by a slight buckle of the strip, and so registering the leading end of the strip, clamping the strip adjacent the leading end thereof to said means and drawing the strip taut and removing the buckle just before the shearing means move through the shearing portion of the cycle to shear the strip.

6. A method of shearing continuously advancing strip comprising positively feeding strip to a shearing zone, at the shearing zone cyclically advancing in the direction of advance of the strip at a speed increasing to substantially the speed of the strip a shear including continuously moving cyclically operating shearing means which move through a complete cycle for each shearing operation, advancing with the shear and relatively to the strip means including a front stop positioned in the path of the leading end of the strip so that the leading end of the strip catches up to and becomes registered to the advancing front stop and so registering the leading end of the strip, clamping the strip adjacent the leading end thereof to said means and interrupting the positive feed of the strip to the shearing zone just before the shearing means move through the shearing portion of the cycle to shear the strip.

7. A method of shearing continuously advancing strip comprising positively feeding strip to a shearing zone, at the shearing zone cyclically advancing in the direction of advance of the strip at a speed increasing to substantially the speed of the strip a shear including continuously moving cyclically operating shearing means which move through a complete cycle for each shearing operation, advancing with the shear and relatively to the strip means including a front stop positioned in the path of the leading end of the strip so that the leading end of the strip catches up to and becomes registered to the advancing front stop, such registry being accomplished and aided by a slight buckle of the strip, and so registering the leading end of the strip, clamping the strip adjacent the leading end thereof to said means and drawing the strip taut and removing the buckle just before the shearing means move through the shearing portion of the cycle to shear the strip.

References Cited in the file of this patent
UNITED STATES PATENTS

| | | |
|---|---|---|
| 1,169,333 | McDonald | Jan. 25, 1916 |
| 1,417,609 | Koerner | May 30, 1922 |
| 1,690,503 | Rhodes | Nov. 6, 1928 |
| 1,982,880 | Pachter | Dec. 4, 1934 |
| 2,406,808 | Conner | Sept. 3, 1946 |
| 2,509,760 | Crafton | May 30, 1950 |
| 2,540,166 | Frank et al. | Feb. 6, 1951 |
| 2,547,157 | Gibbons | Apr. 3, 1951 |
| 2,562,475 | Penkala | July 31, 1951 |
| 2,648,380 | Socke | Aug. 11, 1953 |
| 2,708,968 | Soave | May 24, 1955 |

FOREIGN PATENTS

| | | |
|---|---|---|
| 249,966 | Germany | Feb. 14, 1912 |